United States Patent
Harmon et al.

(10) Patent No.: US 8,179,473 B2
(45) Date of Patent: May 15, 2012

(54) PIVOTING STRUCTURE COUPLED TO A ROTATABLE HOUSING STRUCTURE

(75) Inventors: Roger W. Harmon, Crystal Lake, IL (US); Giles D. McWilliam, Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 411 days.

(21) Appl. No.: 12/474,361

(22) Filed: May 29, 2009

(65) Prior Publication Data

US 2010/0302435 A1    Dec. 2, 2010

(51) Int. Cl.
*H04N 5/225* (2006.01)

(52) U.S. Cl. ........................................ 348/373; 348/375

(58) Field of Classification Search .......................... None
See application file for complete search history.

(56) References Cited

U.S. PATENT DOCUMENTS

| | | | |
|---|---|---|---|
| 5,913,089 A | 6/1999 | Ebe | |
| 6,229,569 B1 | 5/2001 | Saito et al. | |
| 7,021,773 B2 | 4/2006 | Ishino | |
| 7,194,290 B2 * | 3/2007 | Matsunami | 455/575.1 |
| 7,422,381 B2 | 9/2008 | Nakano | |
| 2006/0098119 A1 * | 5/2006 | Lee | 348/376 |
| 2007/0133976 A1 | 6/2007 | Gutierrez et al. | |
| 2007/0206116 A1 * | 9/2007 | Chou | 348/373 |
| 2009/0256955 A1 * | 10/2009 | Kuo et al. | 348/376 |

FOREIGN PATENT DOCUMENTS

| | | | |
|---|---|---|---|
| JP | 2004053836 A | | 2/2004 |
| JP | 2004-104546 | * | 4/2004 |
| JP | 2004104546 A | | 4/2004 |
| JP | 2005109538 A | | 4/2005 |
| WO | 2007118934 A1 | | 10/2007 |

OTHER PUBLICATIONS

Thieme, Markus: "The International Search Report and the Written Opinion of the International Searching Authority", European Patent Office, Rijswijk, completed Jul. 12, 2010, mailed: Jul. 19, 2010, all pages.

* cited by examiner

*Primary Examiner* — Luong T Nguyen
(74) *Attorney, Agent, or Firm* — Gary J. Cunningham

(57) ABSTRACT

Disclosed are pivoting structures and methods of pivoting structure. The pivoting structures can include a movable shutter plate including an aperture, pivotally fastened to a supporting plate by the pivot pin, and having a slot that receives a slot pin of a rotator, the movable shutter configured to move across the rotator as the first housing and second housing change their orientations with respect to one another. In a particular position, an aperture of the moveable shutter plate is aligned with an aperture of the first housing.

10 Claims, 4 Drawing Sheets

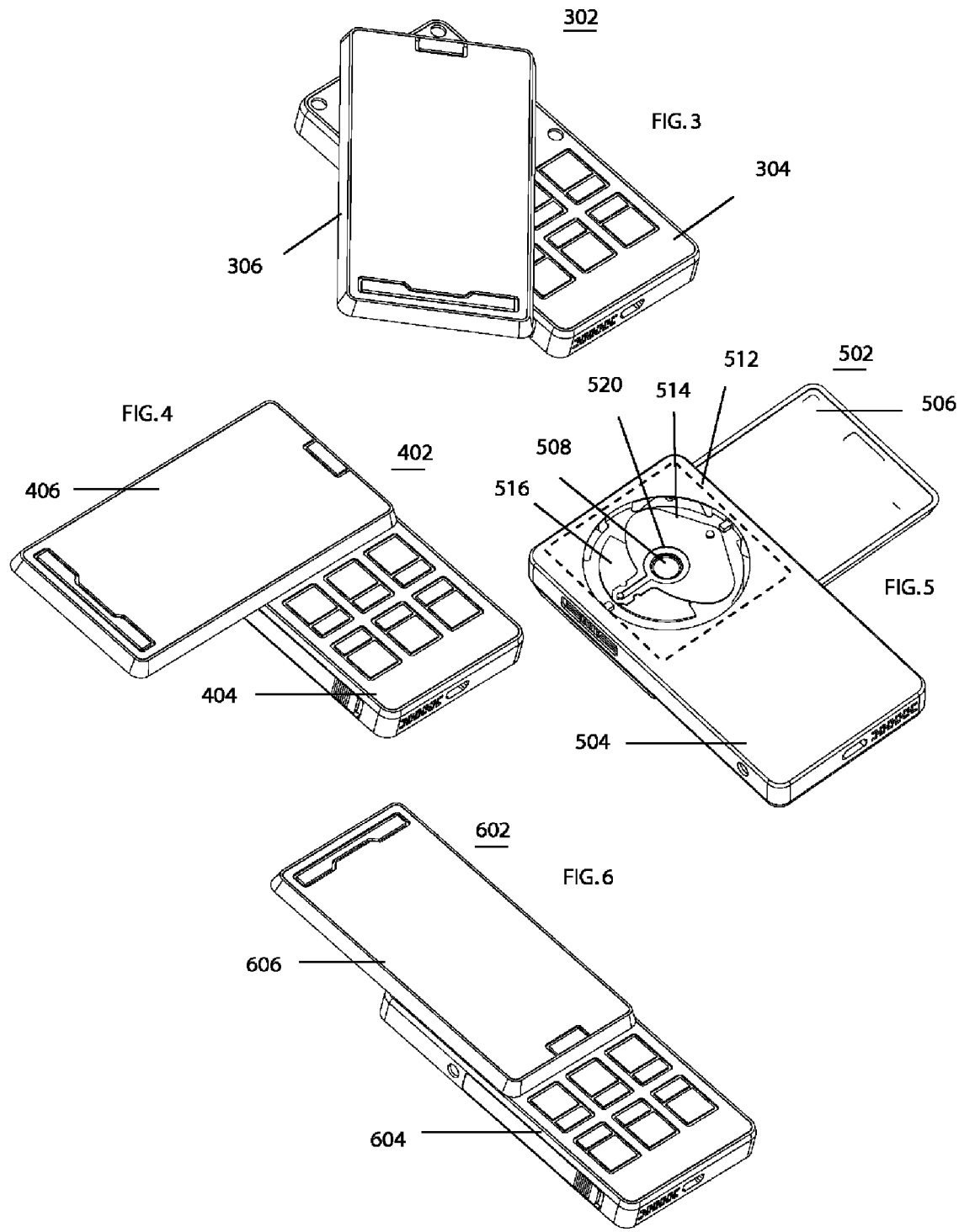

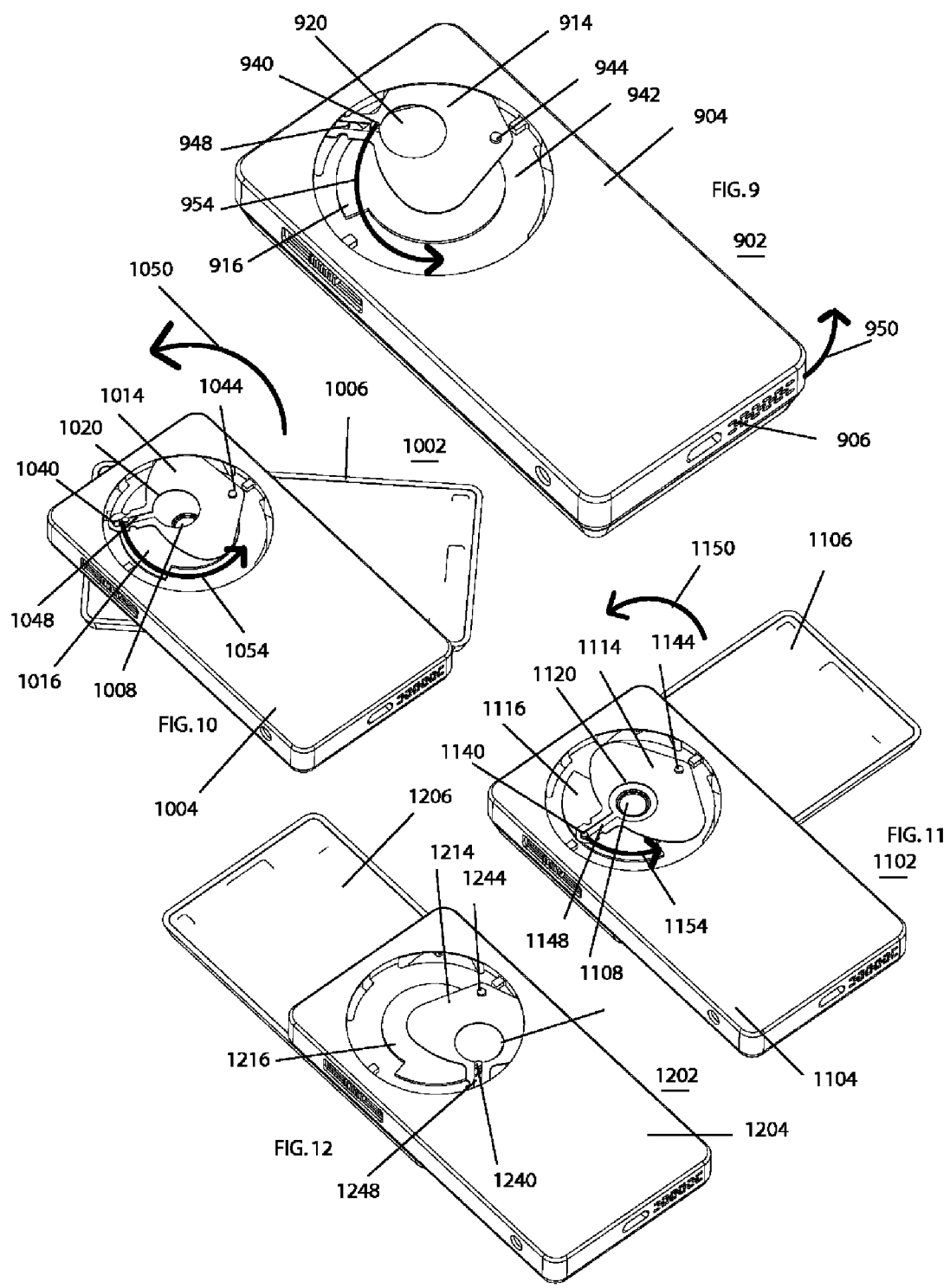

PIVOTING STRUCTURE COUPLED TO A ROTATABLE HOUSING STRUCTURE

FIELD

Disclosed are pivoting structures and methods of pivoting structures, and in particular, a pivoting structure including a movable shutter plate having an aperture that becomes aligned with an aperture of a rotatable housing structure supporting the disclosed pivoting structure.

BACKGROUND

Lens covers are desirable for cameras. Optical and image quality can be compromised if a camera lens is not protected while not in use. Moreover, for high quality cameras, there is a desire to protect the lens from debris and fingerprints when the imager is not in use. Lenses of cameras that are incorporated into mobile communication devices are even more prone to different types of damage and dirt based on frequency of the handling of mobile communication devices by their users.

Manually positioned lens covers are not practical for small cameras. Moreover, manually positioned lens covers are prone to breakage and being lost. Automatically positioned lens covers include complex electromechanical actuators and mechanisms. Automatic features can be expensive to implement in terms of parts and manufacturing. Moreover, automatic features can draw on a device's power supply, and may be prone to malfunction.

BRIEF DESCRIPTION THE DRAWINGS

FIG. 3 depicts an embodiment of a rotator form factor device having a first housing and a second housing positioned in a second orientation with respect to one another;

FIG. 4 depicts an embodiment of a rotator form factor device having a first housing and a second housing positioned in a third orientation with respect to one another;

FIG. 5 depicts an embodiment of a rotator form factor device viewed from the opposite side of the device of FIG. 4 with the exterior portion of the camera or video housing removed;

FIG. 6 depicts an embodiment of a rotator form factor device having a first housing and a second housing positioned in another orientation with respect to one another;

FIG. 9 depicts an embodiment the device in a first position having a cut away view of an embodiment of the disclosed pivoting structure;

FIG. 10 depicts an embodiment of device in a second position having a cut away view of an embodiment of the disclosed pivoting structure;

FIG. 11 depicts an embodiment of device in a third position similar having a cut away view of an embodiment of the disclosed pivoting structure; and FIG. 12 depicts an embodiment of device in another position having a cut away view of an embodiment of the disclosed pivoting structure.

DETAILED DESCRIPTION

It would be beneficial if a lens cover were automatically positionable but not a complex electromechanical actuator and mechanism. In devices having rotational form factors, it would be beneficial to link the one or more rotational components directly to an aperture cover. A lens cover, or any other type of shutter, could therefore automatically move between open and closed positions based on the rotational position of two housings with respect to one another.

Disclosed are pivoting structures and methods of pivoting structure. The pivoting structures can include a movable shutter plate including an aperture, pivotally fastened to a supporting plate by the pivot pin, and having a slot that receives a slot pin of a rotator, the movable shutter configured to move across the rotator as the first housing and second housing change their orientations with respect to one another. In a particular position, an aperture of the moveable shutter plate is aligned with an aperture of the first housing.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Figure 1:
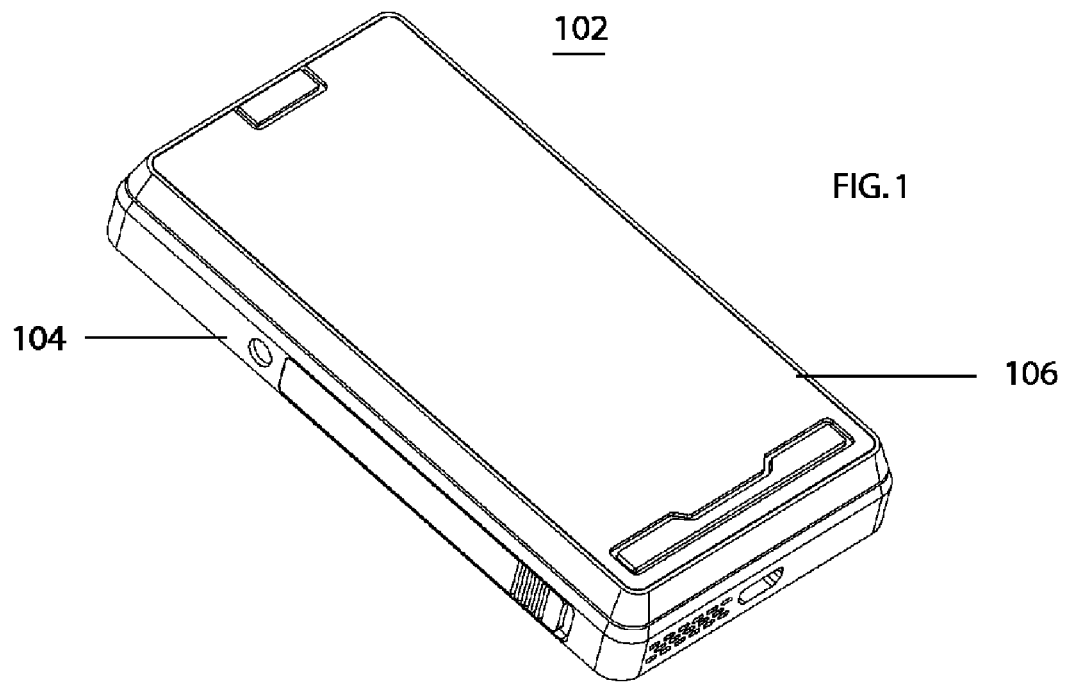
FIG. 1 depicts an embodiment of a rotator form factor device having a first housing and a second housing positioned in a first orientation with respect to one another.

FIG. 1 depicts an embodiment of a rotator form factor device 102 having a first housing 104 and a second housing 106 positioned in a first orientation with respect to one another. In the depicted embodiment, the device 102 is a mobile communication device including a camera and/or a video camera. The view of the device 102 illustrates the second 106 on the top of the first housing 104 which is on the bottom.

Figure 2:
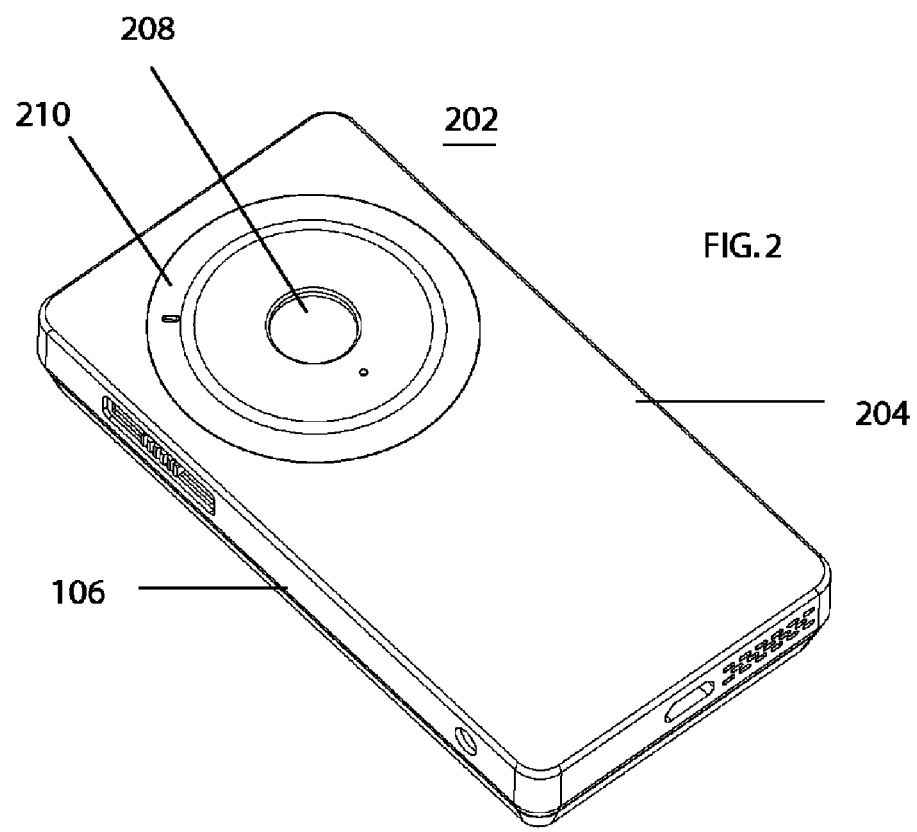
FIG. 2 depicts an embodiment of a rotator form factor device viewed from the opposite side as that depicted in FIG. 1.

FIG. 2 depicts an embodiment of a rotator form factor device 202 (similar to device 102 of FIG. 1) viewed from the opposite side as that depicted in FIG. 1. The exterior face of the first housing 204 which is facing up can include an aperture 208 which is described in detail below (see FIG. 6). It is understood that the device 202 can be any type of device. For example, the device can be a stand alone camera or video camera, or a camera and/or video camera incorporated into a mobile communication device, a flashlight, or a GPS device. A GPS device can have a big screen and can be mounted to a car so it may be always charged and can double as a still/video camera. In the illustrated embodiment, the aperture 208 is that of a camera lens which is surrounded by a camera or video housing 210.

FIG. 3 depicts an embodiment of a rotator form factor device 302 (similar to device 102 of FIG. 1) having a first housing 304 and a second housing 306 positioned in a second orientation with respect to one another. That is, the first housing 204 has been rotated with respect to the second housing 206.

FIG. 4 depicts an embodiment of a rotator form factor device 402 (similar to device 102 of FIG. 1) having a first housing 404 and a second housing 406 positioned in a third orientation with respect to one another. The second housing 406 has been rotated with respect to the first housing 404 so that the first housing 404 and the second housing 406 are at perpendicular to one another.

FIG. 5 depicts an embodiment of a rotator form factor device 502 (similar to device 202 of FIG. 2) viewed from the opposite side of the device 402 (see FIG. 4), however, with the exterior portion of the camera or video housing 210 removed. A dotted line 512 surrounds the aperture 508 and a moveable shutter plate 514 in communication with an rotational opening mechanism, in this embodiment, being rotator 516. The manner in which the movable shutter plate 514 opens and closes the aperture 508, depends upon the location of the shutter plate aperture 520 and the shape of the shutter plate 514. In this example, the shape is oblong and its aperture 520 is centered. It is understood that the shutter plate 514 may be any suitable shape.

FIG. 6 depicts an embodiment of a rotator form factor device 602 (similar to device 102 of FIG. 1) having a first housing 604 and a second housing 606 positioned in another orientation with respect to one another. The second housing 606 has been rotated with respect to the first housing 604 so that the first housing 604 and the second housing 606 are parallel to one another. That is, the second housing 606 has been rotated 180 degrees from its original position (see FIG. 1).

It is understood that the aperture of moveable shutter 520 (see FIG. 5) of the moveable shutter plate 514 may be configured to be moved over the aperture 508 during any particular point in the rotation of the second housing 606 with respect to the first housing 604, depending upon the purpose of the utilization of the shutter. For example, the shutter may cover the light bulb of a flash light. In such a use case, the aperture 520 of the moveable shutter plate 514 may be moved over the aperture 508 when the second housing 606 is parallel to the first housing 604 as depicted in FIGS. 1 or 6. Moreover, there may be more than one aperture 508 of the device, and more than one aperture 520 of the shutter. They may be aligned depending upon the orientation of the first housing 604 and the second housing 606.

Figure 7:
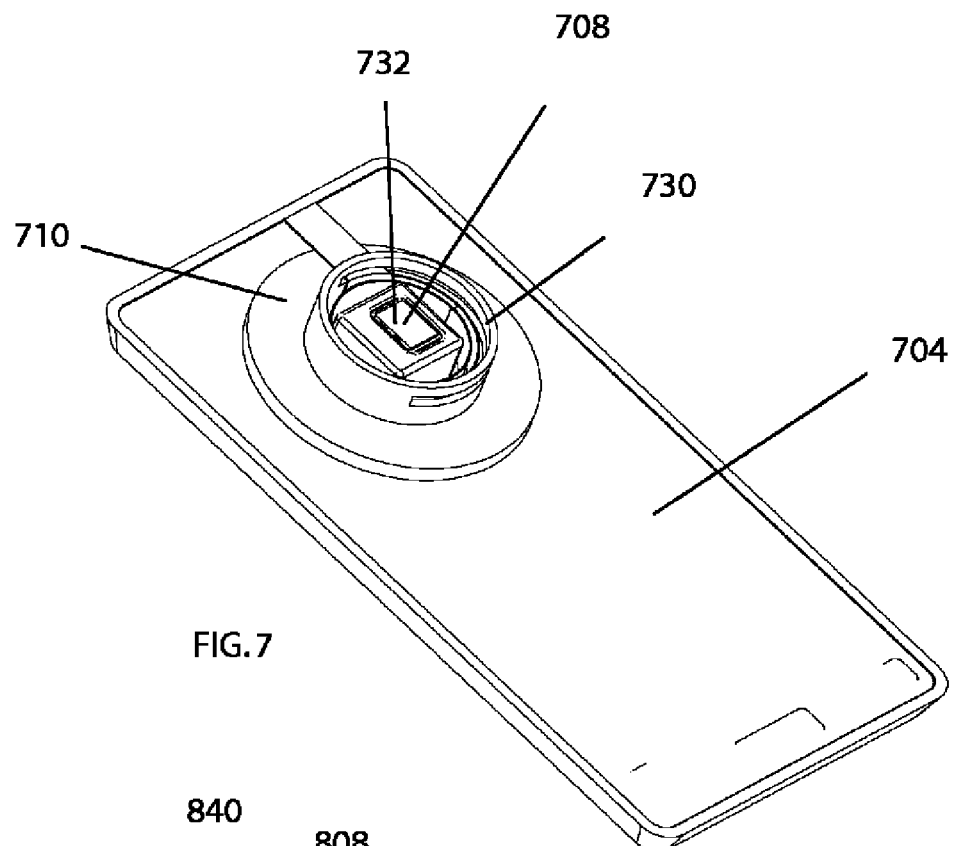
FIG. 7 depicts an embodiment of the interior of the first housing, having components of a still and/or video camera.

FIG. 7 depicts an embodiment of the interior of the first housing 704, having components of a still and/or video camera. By way of example, shown is a flex circuit cylinder 730 and a camera or imager 732 is adhered to the first housing, the camera or imager 732 being positioned within the flex circuit cylinder 730. The aperture 708 is surrounded by a camera or video housing 710 as depicted in FIG. 2 (see housing 210). As mentioned above, the disclosed moveable shutter plate can be used to open and shut any aperture for any use case.

Figure 8:
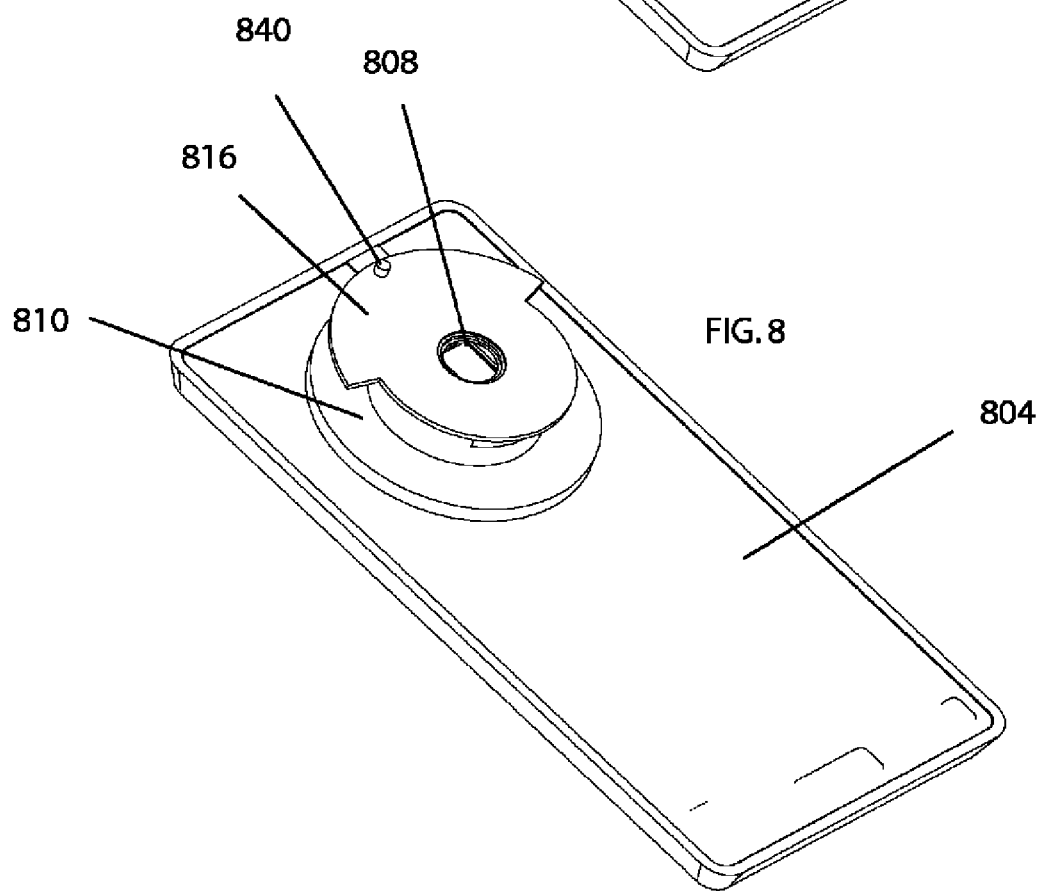
FIG. 8 depicts an embodiment of a rotator plate of the first housing that can rotate around the aperture of the still and/or video camera.

FIG. 8 depicts an embodiment of a rotator plate 816 of the first housing 804 that can rotate around the aperture 808 still and/or video camera. The pivoting mechanism of the opening mechanism is the rotator plate 816 which is coupled to the first housing 804. The rotator plate 816 includes a slot pin 840. The rotator plate 816 is configured to allow the first housing 804 and the second housing 104 (see FIG. 1) to pivot with respect to one another.

FIG. 9 depicts an embodiment of device 902 in a first position similar to that shown in FIG. 2 with the first housing 904, but having a cut away view of the disclosed pivoting structure. The rotator plate 916 of the first housing 904 is adjacent a supporting plate 942 of the second housing 906, the supporting plate 942 including a pivot pin 944 around which the rotator plate 916 pivots. The moveable shutter plate 914 includes a slot 948 through which the slot pin 940 of the rotator plate can pass. When the second housing 906 of the device 902 is rotated from a first position to another position with respect to the first housing 904 in the direction of arrow 950, the rotator plate 916 moves with respect to the supporting plate 942 in the direction of arrow 954, and therefore the slot pin 940 moves in the direction of the arrow 916. As the rotator plate 916 move, so does the moveable shutter plate 914, such being constrained by the slot pin 940 within the slot 948. In the position of the moveable shutter plate 914 shown in FIG. 9, the aperture 920 of the moveable shutter plate 914 is not aligned with the aperture of the first housing 208 (see FIG. 2) and therefore the shutter is closed.

As best shown in FIGS. 2, 9 and 11, in one embodiment, the pivoting structure includes a first housing 904 and a second housing 906, comprising: the first housing 904 housing aperture, coupled to a rotator plate 916, the rotator plate 916 including a slot pin 940; the second housing 906 including a supporting plate 942 adjacent the rotator plate 916, the supporting plate 942 including a pivot pin 944; and a movable shutter plate 914 having an aperture 920, pivotally fastened to the supporting plate 942 by the pivot pin 944, and having a slot 948 that receives the slot pin 940 of the rotator plate 916, the movable shutter plate 914 configured to move across the rotator plate 916 as the first housing 904 and second housing 906 change their orientations with respect to one another, wherein the moveable shutter plate 914 is configured so the aperture 920 of the movable shutter plate 914 is aligned with the first housing aperture 208 (in FIG . 2), in a shutter open orientation (see FIG. 11).

Advantageously, the pivoting structure provides a simple, cost effective and robust structure to link rotational components and can provide an enhanced shutter open structure and orientation when the aperture of the movable shutter plate is aligned with the first housing aperture.

FIG. 10 depicts an embodiment of device 1002 in a second position similar to that shown in FIG. 3, having a cut away view of an embodiment of the disclosed pivoting structure. As the second housing 1006 continues its rotation with respect to the first housing 1004 in direction of arrow 1050, the moveable shutter plate 1014 can continue to move in the direction of arrow 1054, constrained by slot 1048 and the slot pin 1040 of the rotator plate 1016. The aperture 1020 of the moveable shutter plate 1014 can begin to move over the aperture 1008. In this way, an embodiment of the disclosed method includes pivotally moving the moveable shutter plate 1014 over the aperture 1008 during rotational movement of the first housing 1004 and the second housing 1006 with respect to one another.

FIG. 11 depicts an embodiment of device 1102 in a third position similar to that shown in FIG. 5. As the second housing 1106 continues its rotation with respect to the first housing 1104 in direction of arrow 1150, the moveable shutter plate 1014 can continue to move in the direction of arrow 1154, constrained by slot 1148 and the slot pin 1140 of the rotator plate 1116. The aperture 1120 of the moveable shutter plate 1114 has moved into alignment with the aperture 1008. In this way, an embodiment of the disclosed method includes positioning the aperture 1120 of the moveable shutter plate 1114 over the aperture 1108 of the first housing 1104 when the first housing 1104 and the second housing 1106 are at a particular position with respect to one another. In this particular example, they are in alignment with the first housing 1104 and the second housing 1106 are perpendicular to one another.

FIG. 12 depicts an embodiment of device 1202 in another position similar to that shown in FIG. 6. As discussed above, an embodiment of the disclosed method includes pivotally moving the moveable shutter plate 1214 over the aperture 1208 during rotational movement of the first housing 1204 and the second housing 1206 with respect to one another, the moveable shutter plate 1214 constrained by slot 1248 and the slot pin 1240 of the rotator plate 1216. In this example, the moveable shutter plate 1214 has moved beyond the aperture 1108 of the first housing 1204, so that it is now in the closed position.

The disclosed pivoting structures and methods of pivoting structure automatically position themselves during rotation of a device having a rotator form factor. Beneficially, the disclosed pivoting structures are not a complex electromechanical actuators and/or mechanisms. Accordingly, the disclosed pivoting structures, while automatic, are not expensive to implement in terms of parts and manufacturing. Moreover, the disclosed pivoting structures do not draw on a device's power supply, and are less prone to malfunction that a complex electromechanical actuator and mechanism.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiments were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A pivoting structure including a first housing and a second housing, comprising:
   the first housing having a first housing aperture, coupled to a rotator plate, the rotator plate including a slot pin;
   the second housing including a supporting plate adjacent the rotator plate, the supporting plate including a pivot pin;
   a movable shutter plate having an aperture, pivotally fastened to the supporting plate by the pivot pin, and having a slot that receives the slot pin of the rotator plate, the movable shutter plate configured to move across the rotator plate as the first housing and second housing change their orientations with respect to one another, wherein the moveable shutter plate is configured so the aperture of the movable shutter plate is aligned with the first housing aperture in a shutter open orientation.

2. The pivoting structure of claim 1 wherein the orientations of the first housing and the second housing with respect to one another includes being parallel to one another and being at a 90° angle to one another, wherein the aperture of the movable shutter plate is centrally positioned when the first housing and second housing are at about a 90° angle to one another.

3. The pivoting structure of claim 1, wherein the first housing is a display housing, and the second housing is a flip housing.

4. The pivoting structure of claim 1 wherein the moveable shutter plate has an oblong profile.

5. The pivoting structure of claim 1, wherein the rotator plate of the second housing is adjacent a flex circuit cylinder and a camera is adhered to the first housing, the camera being positioned within the flex circuit cylinder.

6. A method of a rotator form factor device, the method comprising:
   providing a pivoting structure including: a first housing having a first housing aperture, coupled to a rotator plate, the rotator plate including a slot pin; a second housing including a supporting plate adjacent the rotator plate, the supporting plate including a pivot pin; and a movable shutter plate having an aperture, pivotally fastened to the supporting plate by the pivot pin, and having a slot that receives the slot pin of the rotator plate, the movable shutter plate configured to move across the rotator plate as the first housing and second housing change their orientations with respect to one another;
   pivotally moving the movable shutter plate having the aperture over the first housing aperture during rotational movement of the first housing and the second housing; and
   positioning the aperture of the movable shutter plate over the first housing aperture defining an open shutter orientation, when the first housing and the second housing are at a particular position with respect to one another.

7. The method of claim 6, wherein the particular position for positioning the aperture of the movable shutter plate over the first housing aperture when the first housing and the second housing are at a particular position with respect to one another is at about a 90 degree angle with respect to one another.

8. The method of claim 6, wherein the particular position for positioning the aperture of the movable shutter plate over the first housing aperture when the first housing and the second housing are at a particular position with respect to one another is at about a 180 degree angle with respect to one another.

9. The method of claim 6, further comprising:
   protecting the lens of a camera of the factor device when the aperture of the movable shutter plate is not aligned with the first housing aperture.

10. The method of claim 6, further comprising:
    exposing the lens of a camera of the factor device when the aperture of the movable shutter plate is in alignment with the first housing aperture.

* * * * *